United States Patent [19]
Okano

[11] 4,083,627
[45] * Apr. 11, 1978

[54] TWO DIMENSIONAL OPTICAL PHASE GRATING FILTER

[75] Inventor: Yukio Okano, Osaka, Japan

[73] Assignee: Minolta Camera Kabushiki Kaisha, Osaka, Japan

[*] Notice: The portion of the term of this patent subsequent to Mar. 1, 1994, has been disclaimed.

[21] Appl. No.: 650,781

[22] Filed: Jan. 20, 1976

[30] Foreign Application Priority Data

Jan. 20, 1975 Japan .................................. 50-7862

[51] Int. Cl.² .......................... G02B 5/18; G02B 5/20; H04N 9/06
[52] U.S. Cl. ................................. 350/162 SF; 358/44
[58] Field of Search ............. 350/162 SF, 314; 358/5, 358/44, 43, 55

[56] References Cited
U.S. PATENT DOCUMENTS 3,940,788  2/1976  Abe et al. ...................... 350/162 SF

*Primary Examiner*—Ronald J. Stern
*Attorney, Agent, or Firm*—Harold L. Jackson; Stanley R. Jones; Joseph W. Price

[57] ABSTRACT

A two dimensional optical phase grating filter is provided that is capable of limiting the transmittance of spacial frequency signals in one or more scan directions. The two dimensional grating of the present invention can be utilized as an optical low pass filter to improve image resolution in a color video system. In the color video system, the two dimensional grating filter could be designed to optically complement a dichroic stripe filter to prevent the introduction of spurious signals by any interference of luminance and chrominance signals. The design parameters of the present invention provide an improved cut-off characteristic with grating widths larger than one-half of the filter period. The two dimensional phase grating filter of the present invention can also be utilized in other optical systems, such as an automatic focusing system, where it is desired to pass only a certain spacial frequency as a monitored signal for the automatic adjustment of the focus of the optical system.

8 Claims, 14 Drawing Figures

TWO DIMENSIONAL OPTICAL PHASE GRATING FILTER

BACKGROUND OF THE INVENTION

1. Field of the Invention

The present invention relates to an optical phase grating filter for providing a cut-off of a subjective spacial frequency without diminishing the light level in the transmitted frequencies. More particularly, the present invention provides an improved two dimensional phase grating that can be utilized as an optical low pass filter for unidirectional scanning, or a low pass filter for a two dimensional target area.

2. Description of the Prior Art

Optical low pass filters have been known in the prior art, particularly in the field of color television camera systems. In color television, the transmission of a color picture representative of the object scene, requires three independent video signals. Generally, a dichroic filter is utilized to modulate the light flux for converting an object scene into high frequency signals.

Various forms of dichroic, or color encoding filters, have been utilized in the prior art, for example, U.S. Pat. No. 3,771,857, and U.S. Pat. No. 3,860,955. These filters are placed in the light path of a pickup tube, or image tube, to separate the light passing through them into primary color component light signals. These light signals are then transformed into electric signals after they have impinged upon a photosensitive element of the pickup tube. The image plane of the optical system is focused on the pickup tube and an electron beam scans a raster in deriving the electrical signals.

In addition to the primary color signals generated, the color encoding filters also provide, throughout their grid, areas that are transparent to the primary colors and thus, pass a luminance signal representative of the brightness of the image. The color signal components and luminance signals can then be electrically separated by circuitry external to the pickup, or image tube. A problem that is recognized in the prior art is the interference, or cross talk, between high frequency luminance signals and the chrominance signals. If the object scene contains high spacial frequency components which fall into the chrominance signal band, spurious signals are produced by the interference between the luminance and chrominance signals. The decoding scheme in the video system can erroneously interpret these spurious high spacial frequencies as color information, and accordingly, incorrect colors will be observed in the reconstruction of the object scene. Thus, it has been known in the prior art that it is highly desirable to eliminate any beat frequencies, and attempts have been made to optically defocus the optical image formed at the target electrode of the image tube.

One approach to solve this problem, has been to utilize an optical low pass filter to introduce phase retardation, and therefore, defocus or cause blurring. The U.S. Pat. No. 3,768,888 and U.S. Pat. No. 3,910,683 disclose the use of rectangular wave phase gratings which include a plurality of sets of laminae to attenuate striped diffraction patterns of Fresnel order of a defocussed image and color striped pattern.

An optical low pass filter utilizing phase grating to attain a response to zero in a frequency over a desired cut-off frequency, while at the same time being independent of the F number of the optical system, is disclosed in the U.S. Pat. No. 3,821,795 and U.S. Pat. No. 3,765,695. Reference is also made to an article "Optical Low Pass Filter For a Single-Vidicon Color Television Camera", by Mino, and Okano, "Journal of the S.M.P.T.E.", Volume 81, page 282 (1972) for background theory.

The U.S. Pat. No. 3,911,479 is cited of general interest to disclose another form of color selective low pass filter.

The desire to provide an economical two dimensional optical low pass filter that is versatile enough to be utilized not only in a one dimensional function, such as in the line scanning of a vidicon, but also, in a two dimensional capacity is still a goal of the prior art.

SUMMARY OF THE PRESENT INVENTION

The present invention provides an improved two dimensional optical phase grating filter that can be utilized either in a one dimensional capacity, or in a two dimensional capacity to provide spacial modulation of various frequencies. Basically, the optical filter comprises a plurality of unitary, or elementary, gratings having phase portions wherein the total width of the phase portions in a unitary grating is greater than one-half of the unitary grating period at least in a one dimensional direction. The two dimensional grating filter parameters satisfy the folowing relationships:

$$Q = 1 - 2) P/A) (1 - \cos\delta) \quad -0.4 \leq Q \leq 0.2$$

wherein

A is the total area of the unitary or elementary grating of the filter;

P is the effective phase area in the unitary grating; and $\delta$ is the phase retardation.

The phase retardation, $\delta$, produced by the unitary grating, can be further defined as follows:

$$\delta = (2\pi/\lambda) (n - n')d$$

wherein $\lambda$ = the design wave length of incident light;

$n$ = refractive index of the phase retardation portion;

$n'$ = refractive index of the medium, such as air; and $d$ = the thickness of the phase portion.

Finally, an additional parameter of the present invention can be defined as follows:

$$0.2 \leq P/A \leq 0.35.$$

The features of the present invention which are believed to be novel are set forth with particularity in the appended claims. The present invention, both as to its organization, manner of operation, together with further objects and advantages thereof, may be best understood by reference to the following description, taken in conjunction with the accompanying drawings.

DESCRIPTION OF THE PREFERRED EMBODIMENTS

Figure 1:
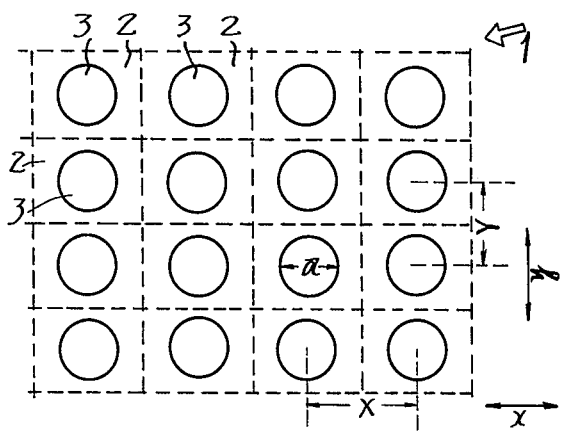
FIG. 1(a) is a schematic plan view of a first embodiment of the present invention.
FIG. 1(b) is a plot of the optical transfer function value versus spacial frequency.

The following descriptions are provided to enable any person skilled in the optical design and video transmission art to make and use the invention and they set forth the best modes contemplated by the inventor for carrying out his invention. Various modifications, however, will remain readily apparent to those skilled in the above arts, since the generic principles of the present invention have been defined herein specifically to provide a relatively economical and easily manufactured two dimensional optical phase filter.

Reference is made to the U.S. Pat. Nos. 3,756,695; 3,821,795; 3,768,888; and 3,910,683; and also the article "Optical Low-Pass Filter For A Single-Vidicon Color Television Camera" by Mino, and Okano, "Journal of the S.M.P.T.E.", Volume 81, page 282 (1972) for relevant design and background theory to the present invention. These references are specifically incorporated herein to supplement the present disclosure by reference.

The present invention relates to an improved two dimensional phase grating filter design capable of being utilized as an optical low pass filter for defocussing, or blurring, a transmitted optical image.

In U.S. Pat. No. 3,756,695, the inventor of the present invention proposed a two dimensional phase grating for use as an optical low pass filter having phase retardation portions systematically arranged in the form of stripes, or dots. The phase grating has a design parameter such that a cross-section of the phase grating in one direction would be the shape of a rectangular wave, wherein the width of the periodic phase retardation portions would be respectively equal to each other and the width would be less than one-half of the period.

The present invention is directed to the discovery that an improved two dimensional phase grating can have effective phase retardation portions whose sum of width measured along a specific direction is larger than one-half the period of the grating and if designed within certain parameters, the two dimensional phase grating will have superior cut-off characteristics at a specific spacial frequency region compared to that of the previous low pass filter disclosed above.

More specifically, the present invention provides a two dimensional phase grating that includes a plurality of unitary grating elements having phase portions which extend two dimensionally and provide a phase retardation to transmitted light between those portions of the grating base plate covered by the phase portion and the portion of the grating not covered. The effective phase retardation portions being designed so that the total width of the phase portions in a periodic unitary grating is greater than one-half of the period of the unitary grating in at least one direction. The two dimensional grating further satisfying the following design relationships wherein the dc level, Q, representative of the optical transfer function (OTF) of the filter satisfies the following relationships:

$$Q = 1 - 2(P/A)(1 - \cos\delta) \quad (1)$$

$$-0.4 \leq Q \leq 0.2 \quad (2)$$

In the above equation (1):

A is the area of the unitary grating that is periodically repeated throughout the filter;

P is the effective phase retardation area of the unitary grating; and $\delta$ is the phase retardation produced by the phase portions of the gratings.

The phase retardation, $\delta$, can be further defined as follows:

$$\delta = (2\pi/\lambda)(n - n')d \quad (3)$$

wherein $\lambda$ is the design wave length;

$n'$ is the refractive index of the medium, such as air;

$n$ is the refractive index of the phase portions; and $d$ is the geometrical thickness of the phase portions.

Referring specifically to FIG. 1(a), a first embodiment of the present invention is set forth in a schematic form to illustrate the principles of the present invention. The two dimensional phase grating 1 comprises a plurality of unitary gratings 2 having central circular phase portions 3. The unitary gratings 2 are arranged in an orderly two dimensional matrix to form respective rectangular wave form configurations in a cross-sectional view. The respective periods along the x and y coordinates, are respectively X and Y.

If the two dimensional grating 1 is positioned within an optical system, an optical transfer function (OTF) will be a two dimensional function. If the two dimensional phase grating 1 of the present invention is utilized as an optical low pass filter in a single or double tube color television camera, it can still serve as a low pass filter in a specific one dimensional direction in accordance with the line scanning of the vidicon. The use of a low pass phase filter is advantageous in a video system since the phase filter does not diminish the light level in the transmitted light. If the design OTF value of the present filter is adequate in one direction, it could be utilized as an optical low pass filter in a video system.

Assuming that the optical system in which the two dimensional phase grating 1 is to be positioned is an aberration free system, then the aforesaid one dimensional OTF can be determined as follows. Further assume that the specific one dimensional scanning direction will be the x direction, the diameter of the circular phase portion 3 is $a$, and finally, the phase retardation, $\delta$, produced by the phase portion 3 is $\pm (2m + 1)\pi$, wherein $m$ is an integer number including 0.

For comparison sake, the phase filter characteristics suggested in the U.S. Pat. No. 3,756,695, is set forth in the plot of the optical transfer function versus the spacial frequency of FIG. 1(b). The prior art phase grating sought to nullify the OTF value of the filter over a cut-off frequency by providing a filter wherein the quotient of the areas of the phase reduction portions of the filter divided by the area of a unitary grating would be ¼. The OTF response curve for the case of $a = \frac{1}{3}X$ is disclosed in the solid curve (e) of FIG. 1(b). This curve discloses that when $a$ is $\leq \frac{1}{3}X$, a two dimensional phase grating will provide a cut-off characteristic which is adequate for an optical low pass filter.

Figure 1B:
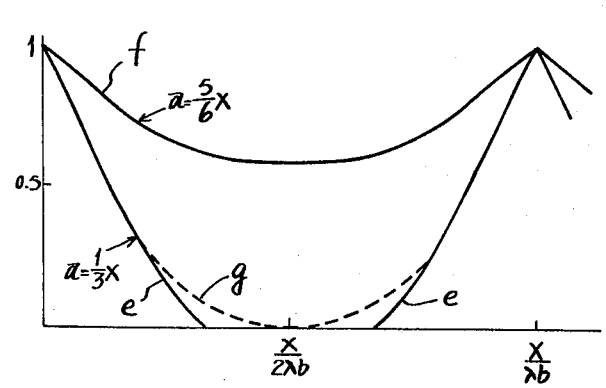

When the diameter of the circular phase portion $a = 5/6X$, the cut-off frequency is not proportional to $a$ but rather, to $(X - a)$ and does not provide a sufficient cut-off characteristic as can be seen by the solid curve (f) of FIG. 1(b).

It can be noted that the OTF response, as shown in FIG. 1(b), will again assume a peak value at a spacial frequency of $(X/\lambda b)$. However, higher frequency peaks of the OTF value are not relevant to the use of the grating as an optical low pass filter in a color television camera since the total signal bandwidth is restricted.

The two dimensional phase grating of the present invention is capable of improving the cut-off characteristic of the prior art two dimensional phase gratings with regard to a specific energy transmitting direction, as can be seen from curve (g) and as will be more fully explained herein.

Figure 2:
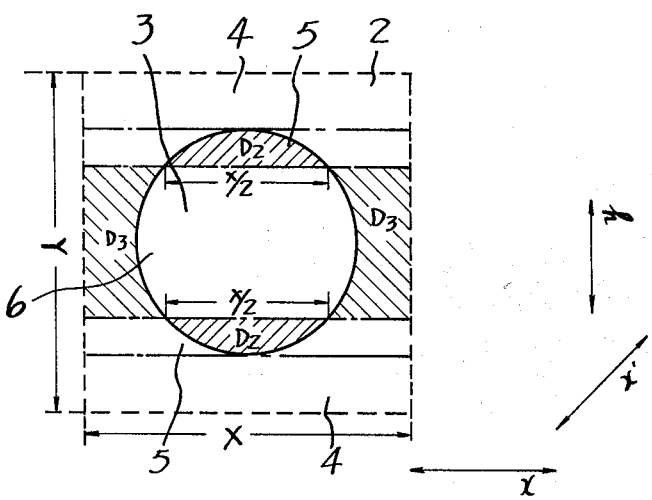
FIG. 2 is a schematic plan view of a unitary grating period disclosing the effective phase retardation portions of the embodiment of FIG. 1(a)

Referring to FIG. 2, an enlarged view of the periodic unitary grating of the two dimensional grating 1 in FIG. 1(a) is shown. If the specific one dimensional direction of energy transmission is taken along the x coordinate across the unitary grating 2, the unitary grating 2 may then be conveniently analyzed by dividing it into three separate regions 4, 5 and 6. The first region, or segment, 4 will not produce any phase retardation in the x direction. The second region 5 includes a portion which produces a change in phase retardation in the direction x with a minimum width $a$ of the phase portions $\leq \frac{1}{2}X$. Finally, the region 6 includes phase portions which will produce a phase retardation in the direction x with the widths of the phase portions $\geq \frac{1}{2}X$.

As disclosed in the prior art such as U.S. Pat. No. 3,756,695, when a one dimensional phase grating is used as a low pass filter and the width $a$ of the phase retardation portions are less than ½ of the period X of the grating, the cut-off frequency is proportional to $a$. Also, when the width $a$ of the phase retardation portions are greater than ½ of the period X of the grating, the cut-off frequency will then be proportional to $(X-a)$, accordingly, in the latter case, the portions of the grating that has the width $(X-a)$, i.e., spaces between the phase portions, can be regarded as effective phase portions.

The present invention is directed to an improved grating filter wherein it has been discovered that an OTF response function indicating a cut-off characteristic in the direction x of a two dimensional phase grating 1 having unitary gratings 2 as shown in FIG. 3, can be determined as an integrated value of the one dimensional OFT response functions of the respective regions 4, 5 and 6. By referring to FIG. 2, it can be seen that by treating the unitary grating 2 in this manner, the one dimensional response of the unitary grating 2 in the direction x will vary along the coordinate y so that an integrated value of a one dimensional response of the grating will represent the OTF response of the grating in the direction x.

The parameters of the two dimensional phase grating of the present invention can be described as a function of the dc level, Q, of the OTF, since it is related to the zero order spectrum of the line spread function. When the dc level is 0, the frequency components over a design cut-off frequency will be attenuated by the grating. The following equations set forth the parameters of the present invention:

$$Q = 1 - 2\frac{D_2 + D_3}{A}(1 - \cos\delta) \qquad (4)$$

$$-0.4 \leq Q \leq 0.2 \qquad (2)$$

wherein
A is the total area of the unitary grating;
$D_2$ is the area of a phase retardation portion in region 5;
$D_3$ is the area of the non-phase retardation portions in region 6.

The OTF of the grating decreases with increasing spacial frequency up to a cut-off frequency, $f_c$, which can be determined as follows:

$$f_c = (X/2\lambda b) \qquad (5)$$

wherein
$\lambda$ is the wave length of light; and
b is the distance between the grating and the image plane, when the grating is placed in a lens system.

The cut-off frequency can be subjectively determined so that it will be 0 when the dc level of the OTF reduces to 0. For use of the present phase grating as a low pass filter in a video system, the parameters of equation (2) should be maintained to take into consideration the fact that the lens system may suffer from residual aberration and that the phase difference $\delta$ will vary with different wave lengths. Referring again to FIG. 1(b), a comparison of the improved two dimensional phase grating of the present invention can be seen with that of the prior art wherein curve (g) discloses the OTF response of the phase grating for the direction x shown in FIG. 2 when the diameter of the phase portion is $5/6X$. As can be seen from curve (g) in comparison with curve (e), the present two dimensional phase grating which further meets the requirements of equations (1) and (2) and has a width $a = 5/6X$, provides substantially the characteristics of that of the two dimensional phase grating having a width $a = \frac{1}{3}X$, but further, has an improved sharply defined cut-off characteristic that increases its value as an optical low pass filter.

To simplify the conditions of the present invention for purposes of analyzing other geometrical configurations of the phase retardation portions in a two dimensional grating, we can summarize the effective phase area of the unitary grating as follows. Assume that the total area of the effective phase portions shown by the hatched lines in FIG. 2 is P, then:

$$P = D_2 + D_3. \qquad (6)$$

Accordingly, equation (4) may be rewritten utilizing the effective phase area P as follows:

$$Q = 1 - 2(P/A)(1 - \cos\delta) \qquad (1)$$

Thus, equation (1) and (2) set forth the parameters of the two dimensional phase grating of the present invention.

Referring again to FIG. 1, the curve (f) represents an OTF response of a grating having a width equal to 5/6× with an effective phase total area, P/A = 0.105. Obviously, a grating with these parameters is not capable of acting as a low pass optical filter with a selected cut-off frequency. The invention of the present grating is represented by curve (g) and can have a grating width of $a = 5/6\times$ by maintaining P/A = ¼ within the parameters of equation (2). As can be seen from curve (g), the present invention within the desired parameters provides an excellent cut-off characteristic for use as an optical low pass filter.

The above description with reference to the curves of FIG. 1(b), refers to an optical transfer function for the phase gratings in the direction $x$, such as shown in FIG. 2. The cut-off characteristics for an optical low pass filter in a direction $x'$, other than the direction $x$, will differ. This is because the effective phase area may present varying values depending on the geometrical configuration of the two dimensional grating and the effective area P that may be available.

Broadly, as long as the relationship of the effective phase area P, the phase retardation δ and the area A of the unitary grating are within the parameters of equations (2) and (4) with respect to any specific scanning direction of, for example, a pickup tube element, the two dimensional phase grating of the present invention may be used as an optical low pass filter for use in a color television camera. If a color television camera system requires a low pass optical filter, both in the scanning direction and in a direction at a right angle thereto, it is possible to design a two dimensional phase grating filter within the parameters of equations (2) and (4) to meet this demand.

As noted above, the characteristics of an optical low pass filter can vary depending upon the scanning direction since the ratio P/A will vary depending upon the configuration and arrangement of the effective phase retardation portions. The following embodiments of the present invention are given to illustrate variations in P/A within the parameters of the present invention.

Figure 3A:
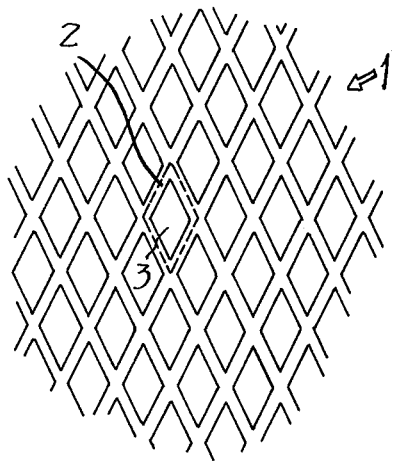
FIG. 3(a) is a schematic plan view of a second embodiment of the present invention.
Figure 3B:
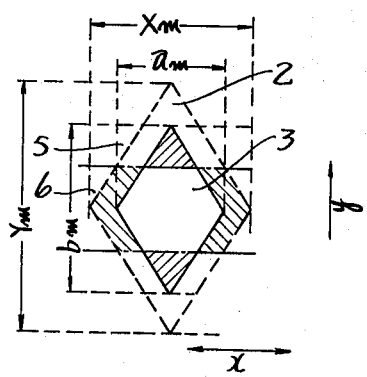
FIG. 3(b) is a schematic plan view of a unitary grating period of FIG. 3(a)
Figure 3C:
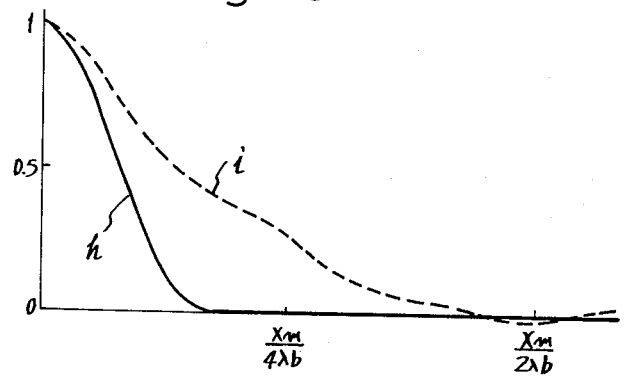
FIG. 3(c) is a plot of the optical transfer function value versus spacial frequency.

Referring to FIGS. 3(a) and 3(b), a second embodiment of the present invention is disclosed having a unitary, or elementary grating, 2, repetitively positioned in a two dimensional area with a phase portion 3 of a diamond shape. The periods in a two dimensional area are respectively Xm and Ym. The effective phase area of the regions 5 and 6 in a scan one dimensional direction $x$ are shown by the hatched lines respectively. The widths $a$ of the effective phase portions in the direction $x$ with a period X are functions of the $y$ coordinate. Assuming a maximum width am and a maximum period Xm of the phase portion in the direction $x$ and a maximum width bm and maximum period Ym of the phase portion in the direction $y$, then P/A = ¼ and Q = 0 when the following values are maintained:

$$bm/Ym = am/Xm = 5/6 \quad (7)$$

$$\delta = \pm (2m + 1)\pi \quad (8)$$

where $m$ can be any integer including 0. The OTF response for this embodiment is shown by the solid line (h) in FIG. 3(c).

If the design parameters were limited to ½ for the effective width of the grating, such as:

$$\frac{bm}{Ym} = \frac{am}{Xm} = \frac{1}{2}$$

for the same retardation, δ, and with the dc level Q = 0, as suggested in U.S. Pat. No. 3,756,695, the OTF response is computed as a dotted line (i) in FIG. 3(c). It should be realized that the computation of the OTF curves are advantageously derived with the assistance of a computer. The cut-off characteristic of the two dimensional phase grating of the present invention provides an improved OTF response, as can be seen from curve (h), since the cut-off characteristic shown by curve (h) eliminates a relatively wider frequency range than that of curve (i).

If the two dimensional phase grating shown in FIGS. 3(a) and 3(b) are varied so that $Ym = Xm$ and $bm = am$, then the configuration of the phase portions would be that of a square and the same cut-off characteristics would be achieved both in the $y$ direction and the $x$ direction. When the width Xm > Ym and $bm > am$, the cut-off characteristic of the OTF in the direction $y$ will be different than that in the direction $x$ so that this embodiment of the present invention permits the use of a wider cut-off frequency range, as compared with that of the prior art two dimensional phase grating, and further, provides the designer with a subjective choice in setting the cut-off characteristics both in the $x$ direction and the $y$ direction.

Figure 4:
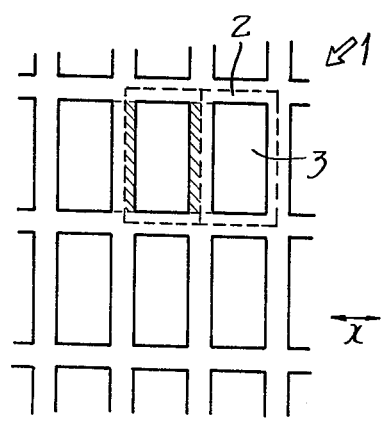
FIG. 4 is a schematic view of a third embodiment of the present invention.
Figure 5:
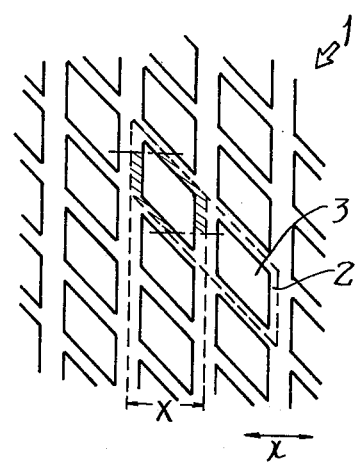
FIG. 5 is a schematic plan view of a fourth embodiment of the present invention.
Figure 6:
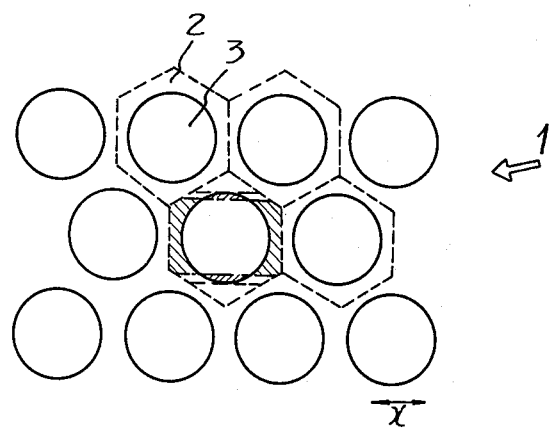
FIG. 6 is a schematic plan view of a fifth embodiment of the present invention.

With reference to FIGS. 4 through 6, additional embodiments of the present invention are disclosed. In each of these embodiments, the dotted lines in the respective figures, represent the unitary grating that is repeated to form the two dimensional phase grating. The hatched portions in the respective figures, disclose the effective phase retardation areas in the elementary gratings with respect to a specific one dimensional direction $x$. In each of the embodiments, the phase retardation portion 3 includes a maximum width which is greater than ½ the period, X/2, in the dimensional direction $x$. In particular, the embodiment of FIG. 4 discloses an effective phase retardation portion 3 having a rectangular configuration. The embodiment of FIG. 5 discloses an effective retardation phase portion having a parallelogram configuration. While the embodiment of FIG. 6 discloses a unitary grating 2 having a hexagonical shape with a phase retardation portion of a circular configuration.

Each of the above respective embodiments disclose a unitary grating 2 having a single phase retardation portion 3. However, this should not be construed as a limitation as to the scope of the present invention, since it is possible to provide a plurality of phase retardation portions in a single elementary grating 2. In that case, the widths of the phase retardation portions in a specific direction, will be the sum of widths of the respective individual phase retardation portions.

Figure 7A:
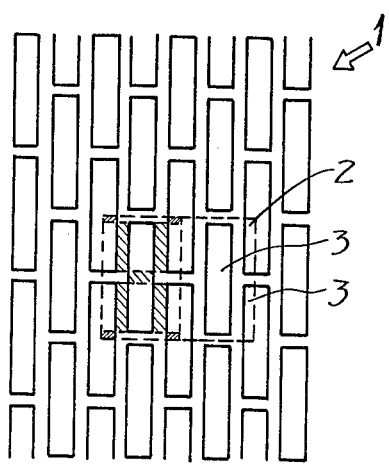
FIG. 7(a) is a schematic plan view of a sixth embodiment of the present invention.
Figure 7B:
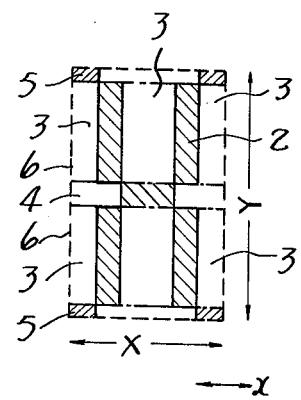
FIG. 7(b) is a schematic plan view of a unitary grating period of the embodiment of FIG. 7(a)

FIGS. 7(A), 7(B), 8 and 9, disclose additional embodiments of the present invention having a plurality of phase retardation portions. With reference to FIG. 7(A) and 7(B), the effective phase retardation portion 3 has a rectangular shape and the unitary grating 2 is repetitively arranged in both the longitudinal and lateral directions. The hatched portions on FIGS. 7(A) and 7(B), denote the effective phase retardation areas P in the $x$ direction. More particularly, the effective phase retardation portions, P, will be the sum of:

(a) the areas of the phase retardation portions corresponding to the region 5 in which the sum of widths of the respective phase portions 3 in the direction x is less than ½ of the period; and (b) the area of the unitary grating 2 other than the respective phase portions, in the portion corresponding to the region 6, wherein the sum of the widths of the respective phase portions 3 in the direction x is greater than ½ of the period.

If the design criterion of equations (1) and (2) are maintained, then the two dimensional phase grating will provide a characteristic cut-off frequency that will be useable as an optical low pass filter.

Figure 8:
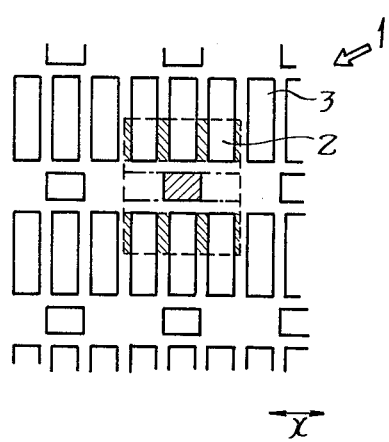
FIG. 8 is a schematic plan view of a seventh embodiment of the present invention.

Referring to FIG. 8, another embodiment of the present invention is disclosed wherein a plurality of phase retardation portions 3 are provided within each unitary grating 2 such that the phase portions 3 are arranged orderly in a specific one dimensional direction x, while the phase portions 3 are arranged in a random manner in another direction. The embodiment of FIG. 8 can also be utilized as an optical low pass filter if the parameters set forth in equations (1) and (2) above, are maintained.

Figure 9:
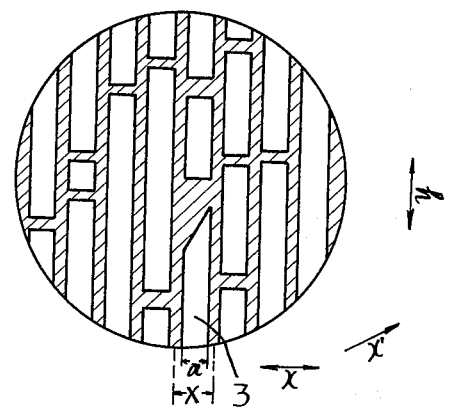
FIG. 9 is a schematic plan view of an eighth embodiment of the present invention.

The embodiment of FIG. 9 can also be utilized as a two dimensional phase grating optical low pass filter within the parameters of the equations (1) and (2). As can be seen from the figure, the phase retardation portions have varying widths in the direction y perpendicular to the direction x. Assume that the widths a of the phase portions 3 are arranged orderly in a specific one dimensional direction along the x axis, and $a \geq \frac{1}{2}X$, it is then possible to utilize the two dimensional phase grating as an optical low pass filter. When the optical low pass filter is positioned in an optical system, such as a single vidicon color television camera, the two dimensional area of the filter will be generally limited by the aperture of the optical system, so that the size of the unitary grating 2 is set to the area of the aperture in the optical system. The cut-off frequency, however, will not be affected by varying the aperture stop if the smallest aperture contains at least two effective laminae for diffracting the light. Accordingly, if the effective phase retardation area P in the specific one dimensional direction satisfies the equations (1) and (2), then the grating may be used as a one dimensional optical low pass filter in a one dimensional direction.

Until the present invention, the characteristics of a two dimensional phase grating having phase retardation portions which were both irregular and regular in geometric configuration had not been understood, so that a two dimensional grating of this nature would not be utilized as an optical low pass filter. The experiments of the present invention, however, prove that a two dimensional phase grating which meets the parameters of the present invention as set forth above, may effectively serve as a one dimensional optical low pass filter.

Referring again to the embodiment disclosed in FIG. 9, even if a specific one dimensional direction is utilized, for example, in the direction x', rather than in the direction x, the cut-off characteristic of the filter will vary proportionally to that of the characteristic derived in the direction x, and thus, it is possible to utilize the embodiment of FIG. 9 as an optical low pass filter with an increased degree of freedom for selecting the cut-off characteristic and scan direction. As mentioned earlier, the illustrative embodiments are presented merely to insure a proper understanding of the present invention, and are not to be considered limiting since other configurations of phase retardation portions including a one dimensional random arrangement are possible if they satisfy the requirements of equations (1) and (2).

Figure 10:
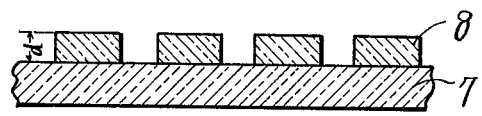
FIG. 10 is a partial longitudinal cross-sectional view of a two dimensional phase grating of the present invention.

Referring to FIG. 10, a cross-sectional configuration of a filter having a rectangular wave form phase retardation arrangement is disclosed. As mentioned earlier, the crosssectional configuration need not be that of a rectangular wave form, and reference is made to the disclosure of U.S. Pat. No. 3,821,795 disclosing a trapezoidal shape and U.S. Pat. No. 2,733,291 disclosing a triangular shape. The average width of the phase retardation portions may be regarded as the width corresponding to that of a rectangular wave form equivalent as disclosed in FIG. 10. In FIG. 10, a transparent base plate 7 has phase retardation portions 8 deposited on its surface to a thickness d. The base plate 7 may be a glass plate having parallel surfaces, or a lens in a lens system. The phase retardation, δ, produced by the phase portion 3, in accordance with the present invention, is given by the following equation:

$$\delta = \frac{2\pi}{\lambda} (n - n')d \tag{7}$$

wherein
λ = the wave length of light;
n = the refractive index of the phase retardation portions 3;
n' = refractive index of the medium, such as air; and
d = the thickness of the phase retardation portions.

As can be readily seen from equation (7), the phase retardation δ is a function of the wave length. As can be appreciated, the incident light in an optical system is generally not a monochromatic light. If, however, the two dimensional grating of the present invention satisfies the equations (1) and (2) above, with respect to a specific wave length within the visual spectrum, the grating may be used as an optical low pass filter with a desired cut-off frequency.

For example, if the grating satisfies the equations (1) and (2) when λ = 0.6μ and a phase retardation δ = ± 3π, then the grating will provide a cut-off characteristic for red light. If, however, λ = 0.53μ, and the phase retardation is designed to provide δ = ± π, the grating may be used as an optical low pass filter which will provide a cut-off characteristic for light across the entire visible light range.

The phase retardation portion 3, as known in the prior art, may be obtained by forming a layer of material, such as silicon dioxide or magnesium fluoride, on a transparent substrate by a vacuum evaporation process.

As can be determined from equation (1), the dc level, Q, of the OTF is a function of cosδ, so that even if material is vacuum evaporated on portions other than the desired phase retardation portions 3, cosδ = cos (−δ), from equation (7), and the grating can be considered to be equivalent for use as an optical low pass filter. Cosδ will be constant as can be readily seen from the following equation:

$$\delta = \pm (2m + 1)\pi \tag{8}$$

wherein m can be any integer including 0. From this equation, it can be seen that even if the thickness d varies to some extent due to errors in manufacturing, cosδ will remain unchanged. From equations (1), (2) and (8), the following relationships can be derived:

$$-0.4 \leq 1 - 4 \frac{P}{A} \leq 0.2 \tag{9}$$

$$0.2 \leq \frac{P}{A} \, 0.35 \tag{10}$$

Accordingly, a grating wherein the area of the unitary grating and the effective phase retardation area satisfy the above equations (9) and (10), will provide a highly advantageous and commercially practical optical low pass filter. The design of the grating can be such that the thickness, $d$, of the phase retardation portion is coincident with the geometric thickness that transmits the light. If a two dimensional phase grating, according to the present invention, is formed on a reflecting surface, such as a reflecting mirror, and the light passes back and forth through the phase retardation portion, the actual effective thickness of the phase retardation portion will be equivalent to the geometrical thickness.

A two dimensional grating, according to the present invention, may be advantageously used as an optical low pass filter in a single, or double, tube type color television camera. In addition, the two dimensional phase grating, according to the present invention, may further be utilized to eliminate, or remove, any interference, or beat, of a mesh pattern type by an appropriate choice of the parameters of the cut-off frequencies in the appropriate directions of the two dimensional phase grating.

The phase grating of the present invention can also be used for image processing wherein the phase retardation portions of the two dimensional phase grating within the design of the present invention are arranged orderly in a specific direction to assume a spacial frequency $f_J$ wherein:

$$f_J = J \cdot Xm/\lambda b \tag{11}$$

In the above equation, J is an integer number and Xm equal the maximum period of a unitary grating along a specific direction. With this design, the OTF value will become unity at the frequency $f_J$. An optical filter within these parameters, will permit image processing and, for example, could be used as a phase grating in an automatic focus adjusting system for a photography camera, motion picture camera, and the like. Previously, the description of the present inventive two dimensional phase grating has been directed to its use as a band pass filter, for example, on a color video system. In an automatic focus adjusting optical system, it is necessary that the light receiving element be capable of scanning in a specific one dimensional direction or be combined with a reflecting mirror, or prism, to achieve a scanning direction. Accordingly, a phase grating of the present invention could provide an optimum cut-off characteristic in the scanning direction.

Reference is made to the disclosure of the Kurihara et al, U.S. Pat. No. 3,713,371 and Konig, U.S. Pat. No. 3,691,922 to disclose background information relevant to automatic focussing in a camera system relating to spacial frequency-contrast dependent scanning of the illumination intensity of the object scene. The subject matter of these references are incorporated herein by reference to supplement the present disclosure. The use of an optical phase grating filter in a focus adjusting optical system has been previously disclosed in a Japanese patent application Publication No. Sho 49-83438, that has been published by the Japanese Patent Office for inspection by the public. With an automatic focus adjusting optical system, it is possible to scan in a specific one dimensional direction either by movement of the light receiving element, or by the use of the reflecting mirror. It is also possible in an automatic focus adjusting optical system to require a frequency modulated transmittance with respect to two directions, for example, as shown in FIGS. 3 and 5. A two dimensional phase grating within the parameters of the present invention, can be useful for various kinds of optical systems other than the above mentioned optical low pass filter and optical band pass filter. Specifically, in an automatic focus adjusting optical system, a two dimensional phase grating can be utilized as either an optical low pass filter or an optical band pass filter to remove, or filter out, interference signals below and/or above the measurement frequency.

If the two dimensional phase grating of the present invention is placed in an optical system, the particular size and period of the effective phase retardation portions will be dependent upon the positions of the grating in the optical system, while the OTF is primarily governed by the configuration, arrangement and phase differences of the phase retardation portions. Accordingly, these factors are subjectively dependent upon the particular optical system in which a two dimensional phase grating is to be utilized. Such various modifications can be accomplished by a person of average skill in the optical field. It is apparent that the scope of the present invention should be determined solely from the following claims, in which

I claim:

1. An improved two dimensional optical phase grating filter comprising;

a plurality of repetitive unitary grating members having a uniform period in at least one direction and capable of providing phase retardation across the plane of the filter, each unitary grating member including at least a retardation segment individually capable of providing phase retardation to a desired incident bandwidth of light energy frequency, $\lambda$, and at least a non-retardation segment individually capable of transmitting the incident bandwidth of light energy frequency, $\lambda$, without retardation, the unitary grating member including an area wherein the total width of the retardation segment is greater than one-half the period in said one direction, the phase grating filter, in said one direction, having the following parameters:

$$Q = 1 - 2 \frac{P}{A} (1 - \cos\delta)$$

$$-0.4 \leq Q \leq 0.2$$

$$\delta = \frac{2\pi}{\lambda} (n - n')d$$

wherein,

A is the total area covered by a periodic unitary grating member;

P is an area of a periodic unitary grating member which is the sum of, first, those phase retardation areas in a first area segment of the unitary grating member wherein the total phase retardation area widths along said direction are less than one-half of the period and secondly, those areas of the unitary grating member other than the phase retardation areas in a second area segment, the second area segment having total phase retardation area widths along said direction greater than one-half of the period;

δ is the phase retardation;

λ is the wave length of a predetermined frequency;

n is the refractive index of the phase retardation grating member;

n' is the refractive index of the medium; and d is the thickness of the phase retardation grating member.

2. The invention of claim 1 wherein the phase retardation, δ, can be further defined as $\delta = \pm (2m + 1)\pi$ with m being any integer including zero and ratio of P/A being limited as follows:

$$0.2 \leq (P/A) \leq 0.35.$$

3. The invention of claim 2 wherein the parameters of the grating members also satisfy the following parameters:

$$Q = 1 - 2\frac{P}{A}(1 - \cos\delta);$$

$$-0.4 \leq Q \leq 0.2; \text{ and}$$

$$\delta = \frac{2\pi}{\lambda}(n - n')d$$

in a second direction across the filter.

4. The invention of claim 1 wherein the parameters of the grating members also satisfy the following parameters $$Q = 1 - 2\frac{P}{A}(1 - \cos\delta);$$

$$-0.4 \leq Q \leq 0.2; \text{ and}$$

$$\delta = \frac{2\pi}{\lambda}(n - n')d$$

in a second direction across the filter.

5. The invention of claim 1 wherein the grating members have a circular configuration.

6. The invention of claim 1 wherein the grating members have a parallelogram configuration.

7. The invention of claim 1 wherein the grating members have a rhomboidal configuration.

8. The invention of claim 1 wherein the periodic grating members include a plurality of disconnected phase retardation portions where the summation of their total effective width is greater than one-half the period of the grating member.

* * * * *